United States Patent [19]

Hosaka et al.

[11] 4,389,458
[45] Jun. 21, 1983

[54] MAGNETIC RECORDING MEDIUM

[75] Inventors: Akihiko Hosaka; Kiyotaka Okuyama, both of Tokyo, Japan

[73] Assignee: TDK Electronics Co., Ltd., Tokyo, Japan

[21] Appl. No.: 341,053

[22] Filed: Jan. 20, 1982

[30] Foreign Application Priority Data

Mar. 26, 1981 [JP] Japan .................................. 56-43184

[51] Int. Cl.$^3$ ...................... B32B 27/28; B32B 27/30; B32B 27/36; B32B 27/40
[52] U.S. Cl. .............................. 428/425.9; 252/62.53; 252/62.54; 427/127; 427/128; 428/694; 428/695; 428/900
[58] Field of Search ..................... 428/900, 425.9, 694, 428/695; 427/127, 128; 252/62.53, 62.54

[56] References Cited

U.S. PATENT DOCUMENTS 4,115,290 9/1978 Kubota et al. ................... 252/62.54

FOREIGN PATENT DOCUMENTS 54-29085 9/1979 Japan .

Primary Examiner—Thomas J. Herbert, Jr.
Attorney, Agent, or Firm—Oblon, Fisher, Spivak, McClelland & Maier

[57] ABSTRACT

In a magnetic recording medium having a substrate coated with a magnetic layer comprising a magnetic powder and a binder, an improvement characterized in that said binder in said magnetic layer essentially consisting of 20 to 60 wt. % of a polyurethane, 15 to 45 wt. % of a polyester resin and 20 to 50 wt. % of a vinyl chloride-vinyl acetate copolymer-impregnated nitrocellulose.

2 Claims, 1 Drawing Figure

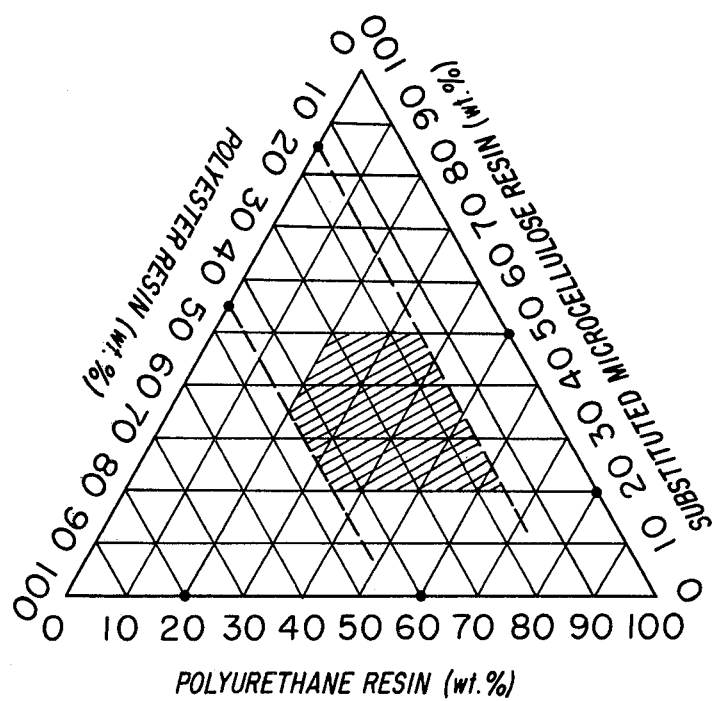

& # 35;

MAGNETIC RECORDING MEDIUM

BACKGROUND OF THE INVENTION

1. Field of the Invention

The present invention relates to a magnetic recording medium. More particularly, it relates to a magnetic recording medium having improved physical characteristics of an adhesive strength and a repeat running durability as well as a electromagnetic transfer characteristic which has a surface smoothness.

2. Description of the Prior Art

A magnetic recording medium usually prepared by coating a magnetic composition of a mixture of a magnetic powder and a resin binder on a substrate such as a resin film. It has been studied to obtain a magnetic recording medium having higher characteristics. Various resin binders used for the preparation of a magnetic recording media have been proposed.

Urethane type resins, vinyl chloride-vinyl acetate copolymer type resins, cellulose type resins, epoxy type resins, phenoxy type resins and vinyl chloride-vinylidene chloride copolymer type resins have been mainly used for the binder. One or two component of the resins has been used.

In the two component type binders, it has been difficult to satisfy with both electromagnetic transfer characteristics and physical characteristics of an adhesive strength and a repeat running durability by controlling a ratio of the two kinds of the resins, because of contradictory characteristics. Thus, satisfactory dual characteristics could not be expected.

Nitrocellulose proposed as a binder has been widely used in view of excellent wettability to a magnetic powder and excellent leveling in the form of a magnetic paint. However, nitrocellulose has a firing property and careful consideration for preventing firing and explosion is needed. It has been required to incorporate 30 to 35 wt.% of isopropyl alcohol as a protective component to nitrocellulose under regulation in order to keep safety in the storage and handling of nitrocellulose composition. On the other hand, when nitrocellulose is combined with a urethane compound, hydroxyl groups of nitrocellulose remained without a nitration are cross-linked with isocyanate groups of the urethane compound. Thus, when nitrocellulose is used as a binder of a magnetic composition, excellent affinity of nitrocellulose to a magnetic powder and excellent kinetic strength resulted by the crosslinking are remarkably effective for improvement of the electromagnetic transfer characteristic and the physical characteristics.

When the crosslinking reaction with isocyanate groups of the urethane compound is utilized, hydroxyl groups of isopropyl alcohol impregnated in nitrocellulose react with isocyanate groups of the urethane compound to reduce a crosslinked degree whereby the effect for improving physical characteristics has been reduced. In order to overcome the disadvantage, it has been proposed to substitute isopropyl alcohol as the protective component by a plasticizer such as dibutyl phthalate or dioctyl phthalate. However, the plasticizer causes weakness of the magnetic layer whereby it has been difficult to attain desired physical characteristics. Moreover, it has been known that nitrocellulose improves a wearing resistance and a running durability whereas nitrocellulose causes inferior adhesive strength as the disadvantage.

SUMMARY OF THE INVENTION

It is an object of the present invention to provide a magnetic recording medium which has both improved physical characteristics of an adhesive strength and a repeat running durability and a electromagnetic transfer characteristic.

The foregoing and other objects of the present invention has been attained by providing a magnetic recording medium having a substrate coated with a magnetic layer comprising a magnetic powder and a binder which is essentially consisting of 20 to 60 wt.% of a polyurethane resin, 15 to 45 wt.% of a polyester resin and 20 to 50 wt.% of a vinyl chloride-vinyl acetate copolymer-impregnated nitrocellulose.

BRIEF DESCRIPTION OF THE DRAWING

The FIG. 1 is a triangular coordinate of three components used as binder for a magnetic layer of a magnetic recording medium of the present invention.

DETAILED DESCRIPTION OF THE PREFERRED EMBODIMENTS

The inventors have studied resin binders especially nitrocellulose and have found that when a combination of a polyurethane resin and a polyester resin with nitrocellulose impregnated with a vinyl chloride-vinyl acetate copolymer, a protective component is used as the three component type binder, both characteristics of the physical characteristics and the electromagnetic transfer characteristic can be satisfied to obtain a magnetic recording medium having the characteristics superior to those of the conventional two component type binder. Further, the disadvantage of the use of nitrocellulose can be eliminated.

The magnetic recording medium of the present invention has a substrate coated with a magnetic layer comprising a magnetic powder and a binder which is essentially consisting of 20 to 60 wt.% of a polyurethane resin, 15 to 45 wt.% of a polyester resin and 20 to 50 wt.% of a vinyl chloride-vinyl acetate copolymer-impregnated nitrocellulose. The magnetic recording medium of the present invention can have a binder of the aforementioned three components with a polyisocyanate as a cross-linking agent as a content of 8 to 25 wt.% based on the resins. In accordance with the present invention, both the electromagnetic transfer characteristic and the physical characteristics of an adhesive strength and a repeat running durability as indispensable important characteristics of a magnetic recording medium are satisfied and the surface smoothness as a contradict characteristic is not inferior, and a magnetic recording medium having excellent characteristic in total can be obtained. Further, in accordance with the present invention, the contradictory physical characteristics of weakness of a magnetic layer and inferior adhesive strength caused by the use of nitrocellulose can be overcome.

In the present invention, the binder composition of the magnetic composition comprises the three components of the polyurethane resin, the polyester resin and the impregnated nitrocellulose resin.

The polyurethane resin is usually a reaction product of a diisocyanate and a compound having hydroxyl groups such as a glycol. It is preferable to use a polyurethane resin having terminal hydroxyl groups. In the present invention, the commercial polyurethane resins can be used.

The polyurethane resins are described in Encyclopedia of Polymer Science and Technology. The typical polyurethane resins include toluenediisocyanate type urethane (TDI): (Nippolan 3002, 3022, 5033, 5034 and 5037. (Nippon Polyurethane K.K.)); diphenylmethanediisocyanate type urethane (MDI); (Nippolan 2301, 2302, 2304 and 2320) and hexamethylenediisocyanate type urethane (HDI): (Nippolan 5032) and Estene 5702 and 5703 (Goodrich Co., Ltd.).

The polyester resin can be commercially available polyester resins as a binder such as Nippolan 1004 and 2006 (Nippon Polyurethane Co.); Desmophene 800 and 1100 (Bayer AG); Bairon 53 S (Toyo Boseki Co.). Saturated or unsaturated linear polyesters for a binder are preferably used and are described in Encyclopedia of Polymer Science and Technology.

The nitrocellulose is cellulose nitrate and described in Encyclopedia of Polymer Science and Technology. The typical commercially available nitrocelluloses are impregnated with isopropyl alcohol or dibutyl phthalate and are H-½ (Asahi Kasei K.K.) and RS-20 (Daicel Co., Ltd.). In the present invention, isopropyl alcohol or dibutyl phthalate in nitrocellulose resin is substituted by vinyl chloride-vinyl acetate copolymer impregnant such as VAGH (UCC.).

In the present invention, the three components are combined at specific ratios which are defined in the triangular coordinate of the three components as the hatched region of FIG. 1, that is the range of 20 to 60 wt.% of the polyurethane resin, 15 to 60 wt.% of the polyester resin and 20 to 50 wt.% of the impregnated nitrocellulose.

When the content of one of the three components is out of the region, at least one of the characteristics indispensable for the magnetic recording medium is lost, and a trouble in a practical use is found in view of total characteristics. For example, when a content of the polyurethane resin is less than 20 wt.%, the adhesive strength and the surface smoothness of the magnetic layer are inferior whereas when it is more than 60 wt.%, the magnetic layer is soft to increase kinematic friction coefficient and to cause squeak sound and to cause tackiness whereby the normal running is prevented.

When a content of the polyester resin is less than 15 wt.%, the repeat running durability is not satisfactory and a magnetic powder on the magnetic layer is peeled off to increase a head adhesion whereas when it is more than 45 wt.%, a dispersibility of a magnetic powder in the magnetic composition is inferior to cause inferior surface smoothness of the magnetic layer.

When a content of the substituted nitrocellulose is less than 20 wt.%, the surface smoothness of the magnetic layer is inferior whereas when it is more than 50 wt.%, an adhesive strength of the magnetic layer on the substrate is inferior though the running stability is good.

In the present invention, the impregnated nitrocellulose is used. If nitrocellulose is impregnated with isopropyl alcohol, the cross-linking reaction is prevented to cause inferior repeat running durability. If nitrocellulose is impregnated with dibutyl phthalate, dibutyl phthalate remains as the plasticizer whereby the magnetic layer is weaken by the plasticizing to cause squeak sound and to cause inferior characteristics especially at high temperature.

In the present invention, the three components are combined at desired ratios to impart the advantageous characteristics of the components for the binder and a magnetic composition is prepared by using the binder and is coated on a substrate to obtain a magnetic recording medium having the desired characteristics. It is further preferable to incorporate a polyisocyanate at a small content to the three components as the binder to improve the characteristics of the magnetic layer. The crosslinking agent contributes the improvement of the physical characteristics such as a kinematic friction coefficient and dust fall resistance. The content is preferably in a range of 8 to 25 wt.%. When the content is less than 8 wt.%, the crosslinking reaction is not satisfactory to form a weak magnetic layer, whereas when it is more than 25 wt.%, the adhesive strength to the substrate is inferior to cause curling phenomenon.

The commercially available polyisocyanates include Colonate L, Colonate HL, and Colonate 2036 (Nippon Polyurethane Co.), Dismodule L (Bayer A.G.). The polyisocyanates are well-known in the prior art.

The magnetic recording medium such as a magnetic recording tape prepared by using the resin binder of the present invention has excellent electromagnetic transfer characteristic and the physical characteristics to be superior to the others in total.

The kinds of the magnetic powder, the solvent, and the additives, and the preparation of the magnetic layers, and the conditions are well-known in this field and accordingly, they are not repeated in this specification.

The present invention will be illustrated by certain examples and references which are provided for purposes of illustration only and are not intended to be limiting the invention.

EXAMPLE 1

| | |
|---|---|
| Co-adsorbed $\gamma$-$Fe_2O_3$ powder: | 400 wt. parts |
| Dispersing agent (Lecithin): | 12 wt. parts |
| Polyester resin (Nippolan 1004 manufactured by Nippon Polyurethane Co.): | 30 wt. parts |
| Polyurethane resin (Nippolan 5033 manufactured by Nippon Polyurethane Co.): | 30 wt. parts |
| Vinyl chloride-vinyl acetate-impregnated Nitrocellulose (substituting isopropanol of H¼ manufactured by Asahi Kasei K.K.): | 40 wt. parts |
| Lubricant: | 6 wt. parts |
| Methyl ethyl ketone: | 400 wt. parts |
| Methyl isobutyl ketone: | 200 wt. parts |
| Cyclohexanone: | 150 wt. parts |

The components were thoroughly mixed by a disperser for paint, and a polyisocyanate (Colonate L manufactured by Nippon Polyurethane Co.) was incorporated at a ratio of 15 wt.% based on the total amounts of the resins and the mixture was stirred to be uniform to prepare a magnetic powder composition.

The composition was coated in a thickness of 6μ on a polyethylene-terephthalate film having a thickness of 15μ. The surface of the coated layer was processed by a super calender treatment and cured by heating it at about 60° C. for 40 hours. The product was cut in a width of ½ inch to prepare each magnetic recording tape.

An adhesive strength, a repeat running durability, an electromagnetic transfer characteristic, a gloss degree and a squeak sound of the resulting magnetic recording tape for video were measured. The results are shown in Table 1 as Sample A.

EXAMPLE 2

In accordance with the process of Example 1 except changing ratios of the polyurethane resin, the polyester resin and the impregnated nitrocellulose, each magnetic recording tape for video was prepared and each adhesive strength, repeat running durability, electromagnetic transfer characteristic gloss degree and squeak sound of the tape were measured. The results are shown in Table 1 as Samples B to I.

REFERENCE 1

In accordance with the process of Example 1 except using isopropanol-impregnated nitrocellulose or dibutyl terephthalate-impregnated nitrocellulose as the nitrocellulose, each magnetic recording tape was prepared and characteristics of the tape were measured. The results are shown in Table 1 as Samples J and K.

In Table 1, the adhesive strength is a peel strength between the magnetic layer and the base film in the direction of 180 degree, and the unit is gram per ½ inch. The electromagnetic transfer characteristic and the gloss degree (measured by Gloss meter manufactured by Murakami Shikisai Sha GM-3D) are shown by relative values to zero (dB) in Sample A (magnetic recording tape of Example 1).

The squeak sound is shown whether any abnormal sound is generated in the repeat running or not.

characteristic but had fatal defect to be inferior as the total characteristics.

In accordance with the present invention, the magnetic recording medium having superior characteristics as the total characteristics is provided in comparison with the products using the conventional binders.

In the examples, Co-adsorbed $\gamma$-$Fe_2O_3$ was used as a magnetic powder, the other magnetic powders of $\gamma$-$Fe_2O_3$, $Fe_3O_4$ and Co-adsorbed $Fe_3O_4$ can be also used. It is also possible to incorporate the conventional additives such as aliphatic acids such as myristic acid, palmitic acid, stearic acid and behenic acid; silicone oil such as dimethyl siloxane; antistatic agents such as metal soap and quaternary ammonium salt; dispersing agents such as aliphatic acid esters, phosphoric acid esters and higher alcohols; lubricants such as butyl stearate, butyl myristate and amyl stearate; and abrasive powders such as $Al_2O_3$, $Cr_2O_3$, SiC, carbon powder, $TiO_2$, $SiO_2$, and $CaCO_3$.

We claim:

1. In a magnetic recording medium having a substrate coated with a magnetic layer comprising a magnetic powder and a binder, the improvement characterized in that said binder in said magnetic layer comprises 20 to

TABLE 1

| Sample No. | A | B | C | D | E | F | G | H | I | J | K |
|---|---|---|---|---|---|---|---|---|---|---|---|
| Ratios of components of Binder | | | | | | | | | | | |
| Polyester resin | 30 | 40 | 20 | 30 | 40 | 60 | 40 | 0 | 50 | 30 | 30 |
| Polyurethane resin | 30 | 35 | 40 | 25 | 50 | 40 | 60 | 50 | 0 | 30 | 30 |
| Impregnated-nitrocellulose | 40 | 25 | 40 | 45 | 10 | 0 | 0 | 50 | 50 | 40 | 40 |
| Characteristics | | | | | | | | | | | |
| Adhesive strength (g) | 48 | 55 | 49 | 42 | 95 | 120 | 140 | 25 | 20 | 30 | 33 |
| Repeat running durability (times) | 790 | 690 | 720 | 850 | 160 | 75 | 90 | 240 | 220 | 280 | 260 |
| Electromagnetic transfer characteristic 5 MHz (dB) | 0 | −0.2 | +0.2 | 0 | −0.3 | −0.5 | −0.2 | +0.2 | −0.4 | +0.2 | 0 |
| Gloss degree (dB) | 0 | −0.3 | +0.2 | +0.1 | −0.4 | −0.9 | −0.4 | +0.3 | −0.7 | +0.3 | −0.1 |
| Squeak Sound | G | G | G | G | B | B | B | G | G | G | B |

G: good
B: bad

As it is shown in Table 1, the magnetic recording tapes of Samples A-D of the present invention had balanced excellent characteristics of the adhesive strength, the repeat running durability, the electromagnetic transfer characteristic, the gloss degree and the creak sound to be superior as the total characteristics. On the other hand, Samples E-K had certain superior 60 wt.% of a polyurethane, 15 to 45 wt.% of a polyester resin and 20 to 50 wt.% of a vinyl chloride-vinyl acetate copolymer-impregnated nitrocellulose.

2. The magnetic recording medium according to claim 1 wherein a polyisocyanate as a crosslinking agent is incorporated in said binder at a content of 8 to 25 wt.% based on the total resin components.

* * * * *